United States Patent
Bone et al.

(10) Patent No.: US 6,378,280 B1
(45) Date of Patent: Apr. 30, 2002

(54) LOCKING MECHANISM FOR AN INTERCONNECTING BAR

(75) Inventors: Daniel Bone, County Durham; Roger Thomas, Cleveland, both of (GB)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/614,528

(22) Filed: Jul. 12, 2000

(30) Foreign Application Priority Data

Jul. 13, 1999 (GB) .............................................. 9916262

(51) Int. Cl.$^7$ ....................... A01D 34/03; A01D 34/43; A01D 34/64
(52) U.S. Cl. ..................... 56/17.1; 280/43.13
(58) Field of Search .......................... 280/43.13, 43.17, 280/43.16; 56/17.2, 255, 14.9, 17.1, DIG. 20, DIG. 24

(56) References Cited

U.S. PATENT DOCUMENTS

| | | | | |
|---|---|---|---|---|
| 2,848,859 A | * | 8/1958 | Abel .......................... | 56/17.2 |
| 2,986,402 A | * | 5/1961 | Winton .................... | 280/43.13 |
| 3,357,715 A | * | 12/1967 | Plamper et al. .......... | 280/43.13 |
| 3,677,574 A | * | 7/1972 | Cyr .......................... | 280/43.13 |
| 4,167,093 A | * | 9/1979 | Pfeiffer et al. ................. | 56/17.2 |
| 5,065,568 A | * | 11/1991 | Braun et al. .................. | 56/14.9 |
| 5,398,489 A | * | 3/1995 | Oshima ........................ | 56/17.2 |
| 5,526,633 A | * | 6/1996 | Strong et al. ................. | 56/17.2 |
| 6,085,508 A | * | 7/2000 | Miatt et al. ................... | 56/17.1 |
| 6,205,754 B1 | * | 3/2001 | Laskowski .................... | 56/15.1 |
| 6,212,863 B1 | * | 4/2001 | Thomas ....................... | 56/17.2 |

FOREIGN PATENT DOCUMENTS

GB          2328359      * 2/1999    .......... A01D/34/74

* cited by examiner

Primary Examiner—Robert E. Pezzuto
Assistant Examiner—Árpád Fab Kovács
(74) Attorney, Agent, or Firm—Harness, Dickey & Pierce, P.L.C.

(57) ABSTRACT

A lawn mower having a deck; wheel assemblies; height adjustment mechanisms positioned intermediate the deck and wheel assemblies; an interconnecting bar positioned between at least two of the height adjustment mechanisms, the interconnecting bar being connected to the height adjustment mechanisms to transfer the movement of one height adjustment mechanism to the other height adjustment mechanism so that the height adjustment mechanisms operate in unison; a rack located on the interconnecting bar; a locking mechanism attached with the rack to hold the interconnecting bar stationary relative to the deck, the locking mechanism including a pinion rotatably mounted on the deck, the pinion meshing with the rack to releasably lock the locking mechanism in a plurality of positions.

23 Claims, 11 Drawing Sheets

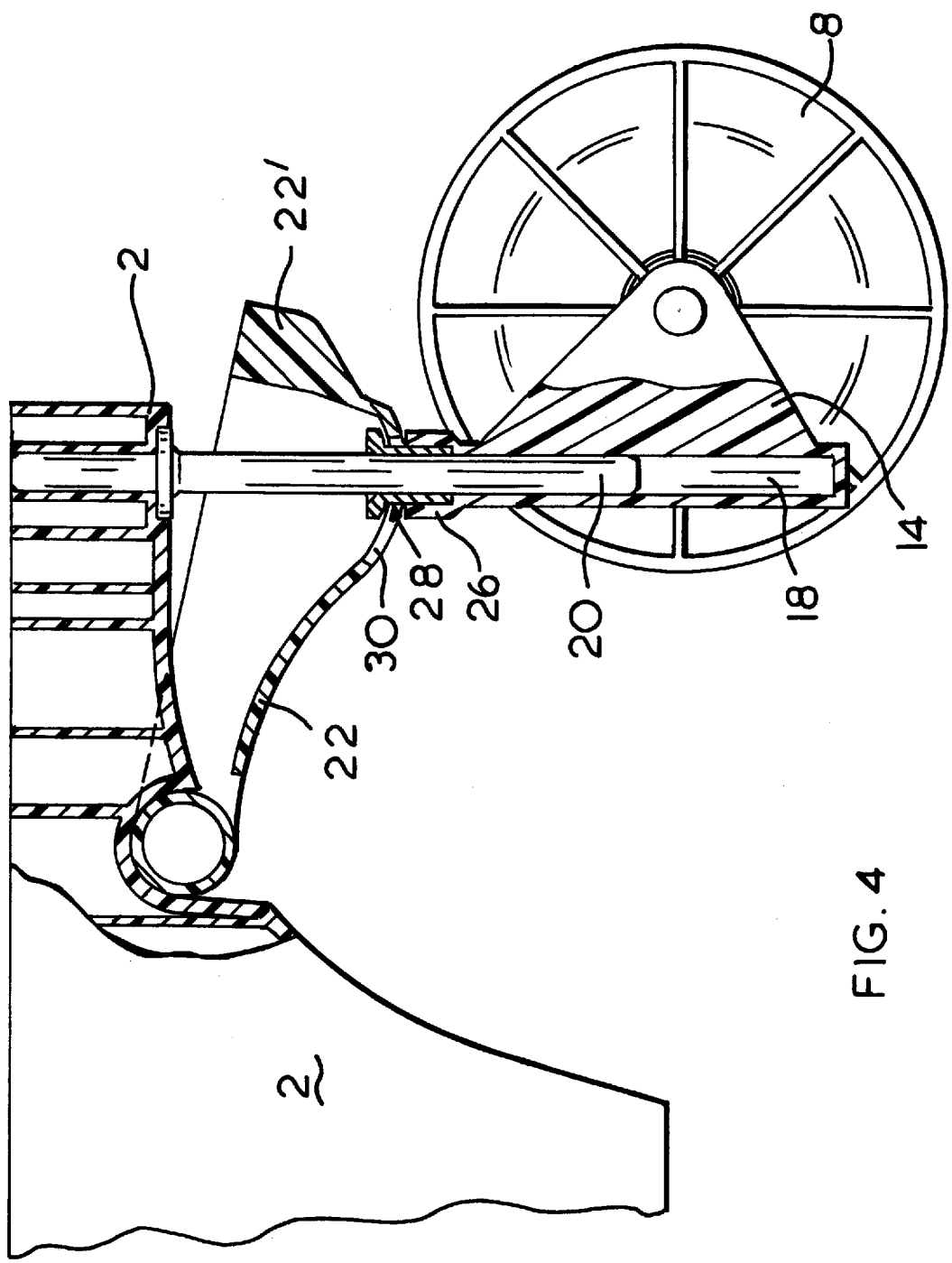

LOCKING MECHANISM FOR AN INTERCONNECTING BAR

BACKGROUND OF THE INVENTION

The present invention relates to lawn mowers and in particular to height adjustment mechanisms for lawn mowers.

Household lawn mowers comprise a cutting deck upon which is mounted a motor. The motor can be driven either by an electric motor powered by either a main electricity supply or a battery or an internal combustion engine. The motor rotatingly drives a cutting blade mounted below the cutting deck about a substantially vertical axis, which cuts the grass beneath the deck as it rotates. The cutting deck is commonly mounted on wheels or rollers, either having a fixed direction of travel so that the lawn mower moves over the lawn in a forward and reverse direction or having a variable direction of travel, for example castor wheels, so that the lawn mower is highly maneuverable.

It is desirable to have the height of the cutting blade adjustable in relation to the surface of the lawn in order to cut the grass to differing heights. One common way of achieving this is by having the cutting deck of the lawn mower mounted on the wheels or rollers in such a manner that the height of the deck, and hence the height of the cutting blade is adjustable relative to the wheels.

Such mechanisms include mounting the wheel or roller assemblies on the ends of levers which are pivotally mounted onto the deck and are capable of being releasably locked into a plurality of angular positions. The height of the cutting deck in relation to the wheels or rollers is dependent upon the angle of pivot of the levers. An interconnecting bar or bars are often added between the levers to ensure that the height of the deck can be adjusted by a single operation and that the height adjustment of interconnected wheels is conducted in unison.

It is desirable to be able to lock the height of the deck above the ground whilst the mower is being used. This can be achieved by locking the interconnecting bar or bars to prevent relative movement between the bar and deck thus locking the height adjustment mechanism on the wheels and thus fixing the height.

GB 2,328,359A discloses one such locking mechanism.

One problem with the design of the locking mechanism disclosed in GB 2 328 35.9 is that once the locking mechanism is released to allow movement of the interconnecting bar, the locking mechanism becomes detached from the interconnecting bar which results in the operator having to directly support and manipulate the deck.

SUMMARY OF THE INVENTION

In a first aspect, the invention is a lawn mower including a deck, wheel assemblies and height adjustment mechanisms positioned intermediate the deck and wheel assemblies. The lawn mower also includes an interconnecting bar positioned between at least two of the height adjustment mechanisms, the interconnecting bar being connected to the height adjustment mechanisms to transfer the movement of one height adjustment mechanism to the other height adjustment mechanism so that the height adjustment mechanisms operate in unison. A rack is located on the interconnecting bar; a locking mechanism attached with the rack holds the interconnecting bar stationary relative to the deck, the locking mechanism includes a pinion rotatably mounted on the deck, the pinion meshing with the rack to releasably lock the locking mechanism in a plurality of positions.

The present invention has the advantage that the pinion remains meshed with the rack at all times. Thus the operator can adjust the height of the deck by controlling the rotational movement of the pinion, thus avoiding the need to support the deck directly. The design is also simple in construction thus reducing costs of production and is easy to operate.

Preferably the pinion is capable of axially sliding between a first position where it is prevented from rotation movement and a second position where it is capable of freely rotating whilst remaining meshed with the rack.

The pinion can be biased towards the first position. Preferably, a cam mechanism is used to axially slide the pinion between the first and second positions. The use of a cam makes the operation of the locking mechanism simpler.

One method of mounting the pinion is to mount it co-axially and rigidly on an axially slideable rod, A knob can be rigidly mounted on one end of the rod. The cam mechanism can act between the knob and the body of a mower. When a mower is mounted on castor wheels, the mower is able to move sideways as well as in the more conventional forwards and backwards direction of travel. If the knob is located on the side of the body of the mower and an operator uses it to move the pinion from its first position to its second position against the biasing force of a spring, the body of the mower may tend to follow the knob, thus preventing the pinion sliding from its first to its second position. Therefore the body of the mower may be required to be held stationary whilst the knob and hence pinion is axially slid from its first position to its second position. The use of a cam mechanism between the knob and the body provides a simple mechanism by which relative movement of the knob relative to the body to be achieved without exerting a force onto the body which results in its movement.

The knob may abut against part of the deck when the pinion is in the first position. The cam mechanism may comprise a cam pivotally mounted on the knob and which comprises a lever. The use of a lever can enable an operator to operate the cam mechanism using the lever. The lever may comprise a large grip area. The benefit gained by the lever having a large grip area is that it is easy to grasp and enables the operator to use the lever to rotate the knob without too much strain on the operator's fingers. Furthermore, by using the lever to rotate the knob, it keeps the hands of the operator away from the body of the mower. When the pinion abuts against the deck, it may co-operate with the deck to prevent the pinion from rotating when the pinion is in the first position.

In one possible construction, the knob or the rod can comprise protrusions which engage with apertures formed in a part of the deck when the pinion is in the first position to prevent the pinion from rotating. Alternatively, the deck can comprise protrusions which engage with apertures formed in the knob when the pinion is in the first position to prevent the pinion from rotating. A person skilled in the art realises that the protrusions can be formed in a range of shapes so long as rotational movement of the pinion is prevented when the protrusions are engaged with the apertures.

The pinion can have a small diameter and the knob can have a large diameter in order to provide a mechanical advantage to ease the height adjustment operation. By designing the knob and pinion so that the diameter pinion is small in relation to the diameter of the knob, a large mechanical advantage can be achieved which allows the height of the mower to be easily adjusted unaided either by mechanical means or by the operator having to apply additional forces manually to the deck to assist in the height adjustment process.

Such mechanical means can comprise biasing means which interacts between the deck and the wheel assemblies to provide an upward biasing force on the deck which counters, at least in part, the downward force of the deck due to its weight.

The use of biasing means eases the adjustment operation, particular, if no mechanical advantage is provided by design. The biasing means counters the height of the mower and thereby reduces forces acting on the height adjustment mechanism and hence transferred to the knob.

In one particular construction, the strength of biasing force can be such that it overcomes the downward force of the deck due to its weight in order to bias the deck to its highest position.

The biasing means can comprise a spring which is connected between the interconnecting bar and the deck. This provides a simple design.

Alternatively, the biasing means can comprise a torsion spring which connects between the knob and the deck and which provides a rotational biasing force on the knob. This provides a compact construction.

BRIEF DESCRIPTION OF THE DRAWINGS

FIG. 4 shows a vertical section of the height adjustment mechanism, the cutting deck and the castor wheel when the height of the deck is at its maximum;

DETAILED DESCRIPTION OF THE PRESENTLY PREFERRED EMBODIMENTS

The first embodiment of the invention will now be described.

Figure 1:
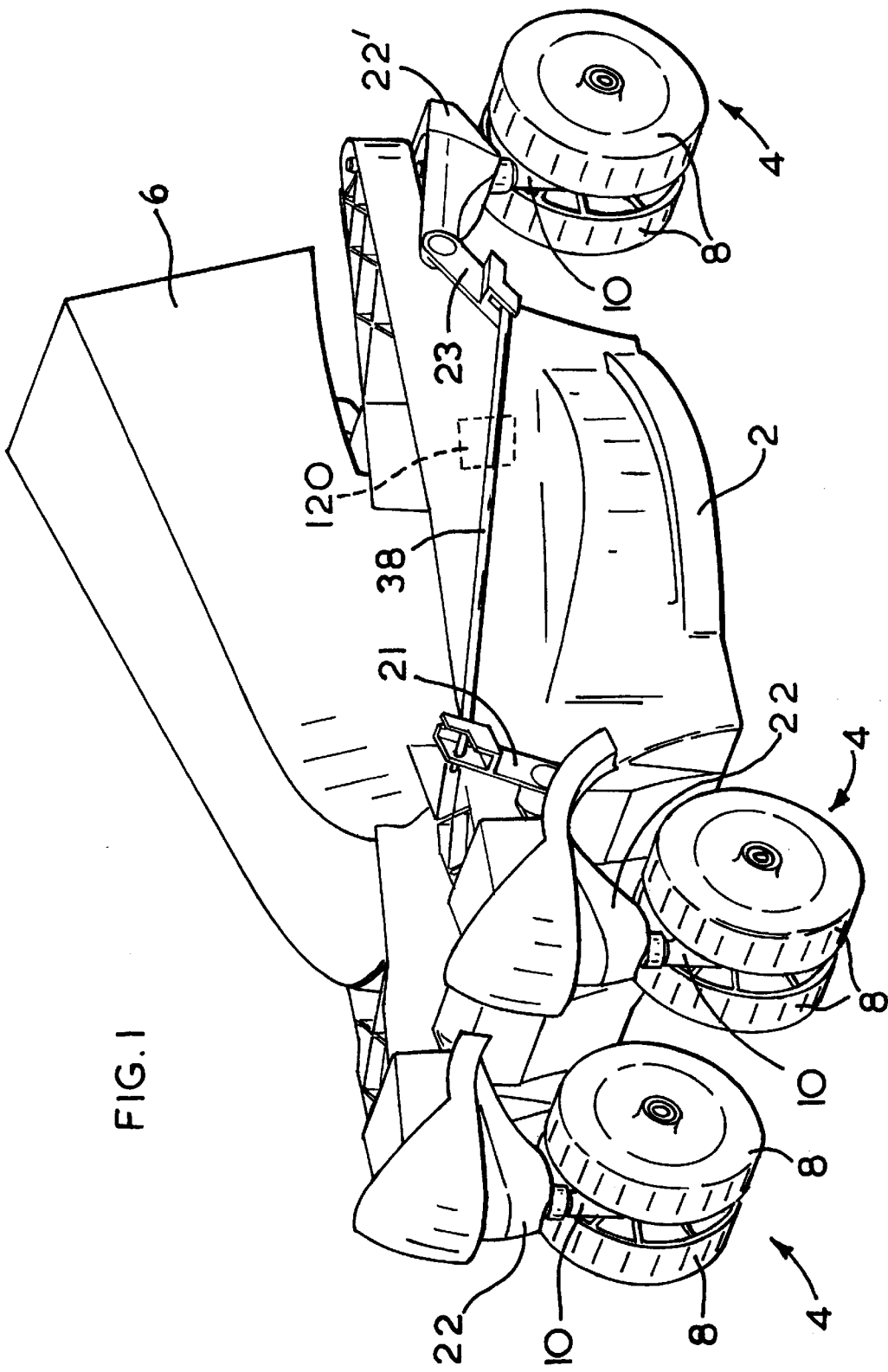
FIG. 1 shows the cutting deck of a lawn mower mounted on four castor wheels.

Referring to FIG. 1, the cutting deck (2) (or frame) of the lawn mower is mounted on four castor wheels (4) located near to the four corners of the deck (2), upon which is mounted an electric motor (not shown) and a hood (not shown) which encloses the motor. The motor rotatingly drives a cutting blade (not shown) mounted below the deck on the output drive spindle of the motor about a substantially vertical axis in known fashion. A grass chute (6) is mounted on top of the cutting deck (2) which directs the grass cuttings from the cutting blade to a grass box (not shown) which attaches to the rear of the cutting deck (2). A height adjustment mechanism is attached to the mower which raises or lowers the height of the cutting deck (2) in relation to the castor wheels (4), hence lifting or lowering the height of the cutting blade in relation to the ground below the mower.

Each of the four castor wheels (4) of the mower and its corresponding height adjustment mechanism are constructed and operate in the same manner.

Figure 2:
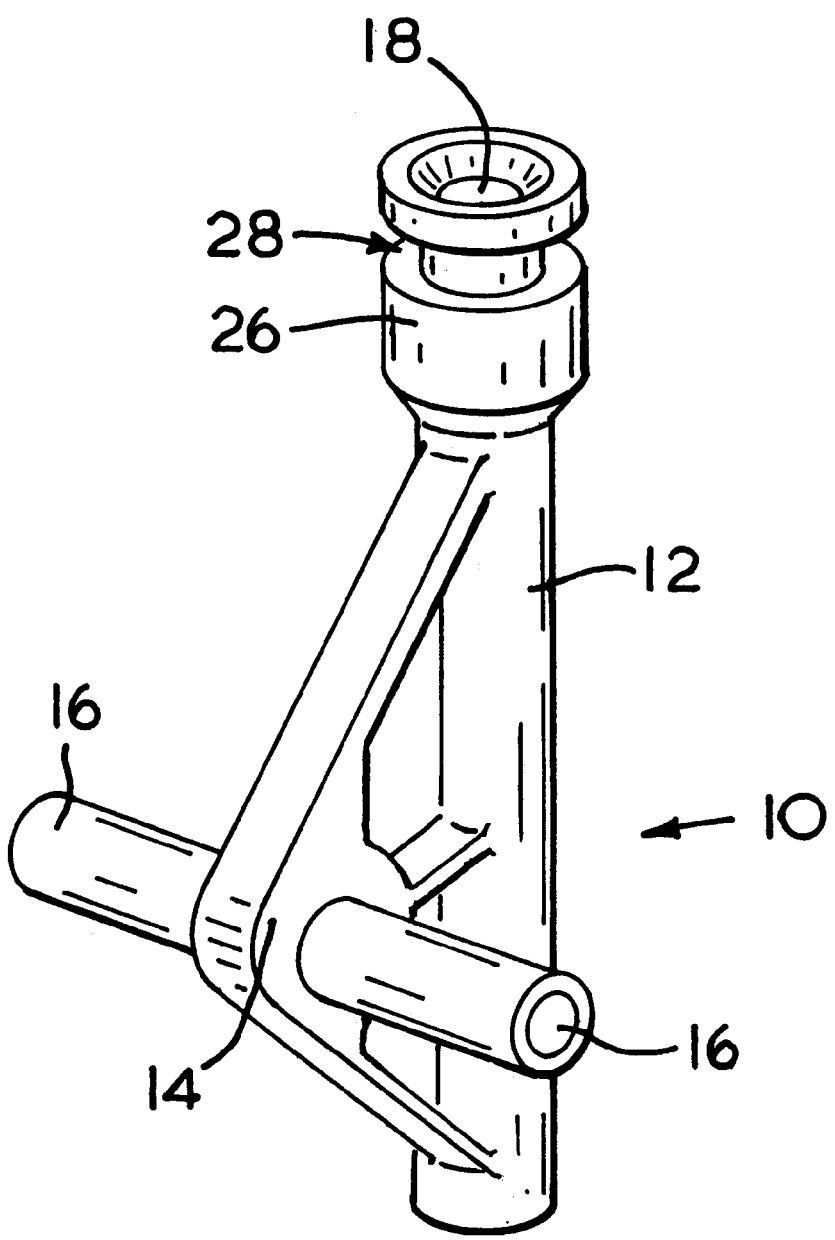
FIG. 2 shows the central mount of a castor wheel.

As can be seen in FIG. 1, each castor wheel (4) comprises two wheels (8) of equal dimensions which are mounted on a central mount (10) adjacent to each other and which have the same axis of rotation. FIG. 2 shows the central mount (10) which comprises a vertical sleeve (12), a vertical triangular flange (14) attached to the side of the base of the sleeve (12) and two shafts (16) of circular cross section which project perpendicularly from the sides of the triangular flange (14) in opposite directions. The sleeve (12) forms a bore (18) of circular cross section which is sealed at the base end. The two horizontal shafts (16) form axles upon which the two wheels (8) are mounted. The wheels (8) are retained upon the axles (16) by means of a clip (not shown) and are able to freely rotate about the axles (16). The central mount (10) is formed from a low friction plastic in a one piece construction.

Figure 5:
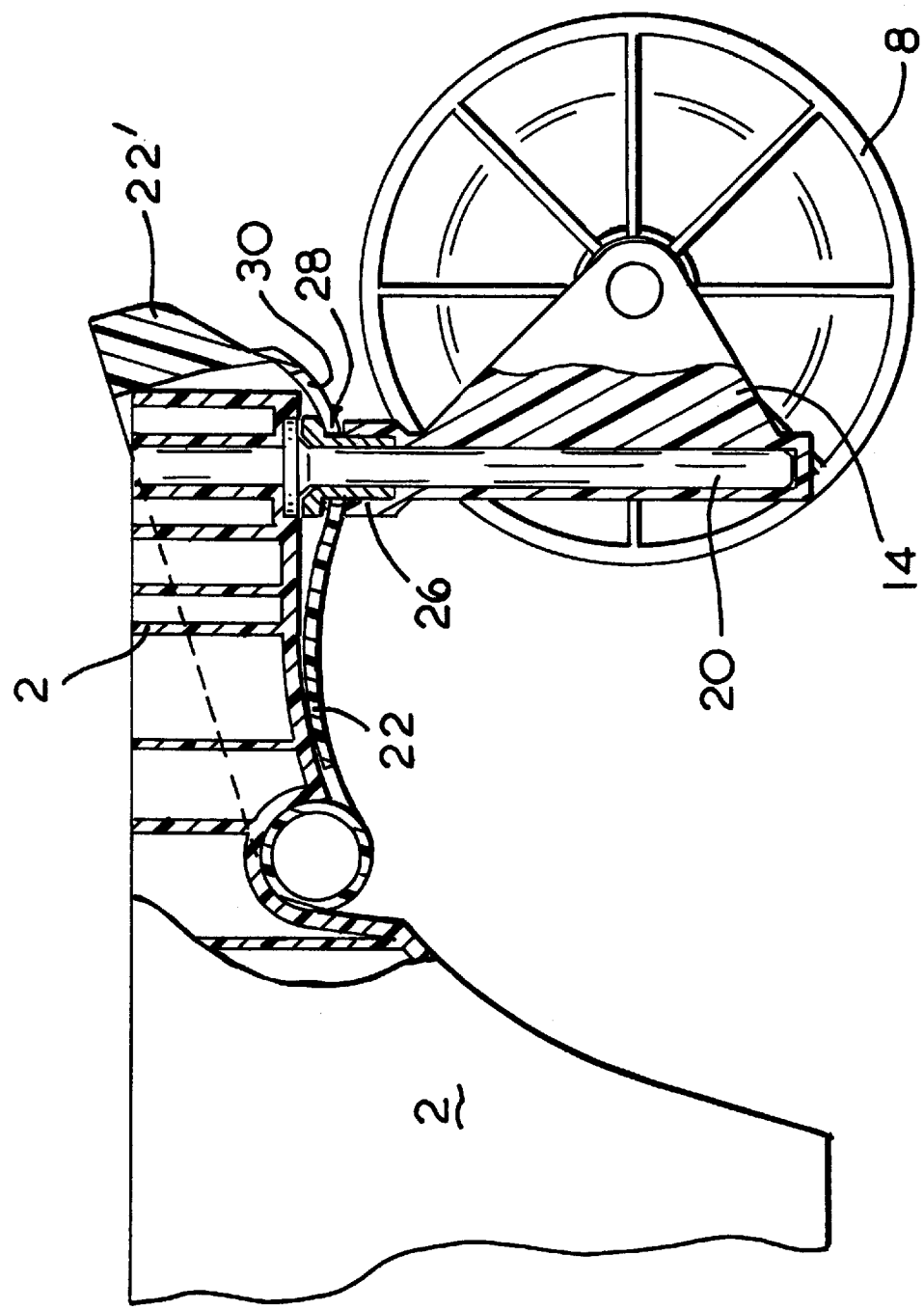
FIG. 5 shows a vertical cross section of the height adjustment mechanism, the cutting deck and the castor wheel when the height of the deck is at its minimum.

Each castor wheel (4) is mounted on a metal rod (20) which is rigidly attached to and projects vertically downwards from the underside of the cutting deck (2) as best shown in the cross sectional drawings shown at FIGS. 4 and 5. The metal rod (20) has a circular cross section having a diameter which is slightly less than that of the bore (18) of the central mount (10). The metal rod (20) is located within the bore (18) of the central mount (10), the central mount (10) being able to freely slide along and rotate about the metal rod (20).

Figure 3A:
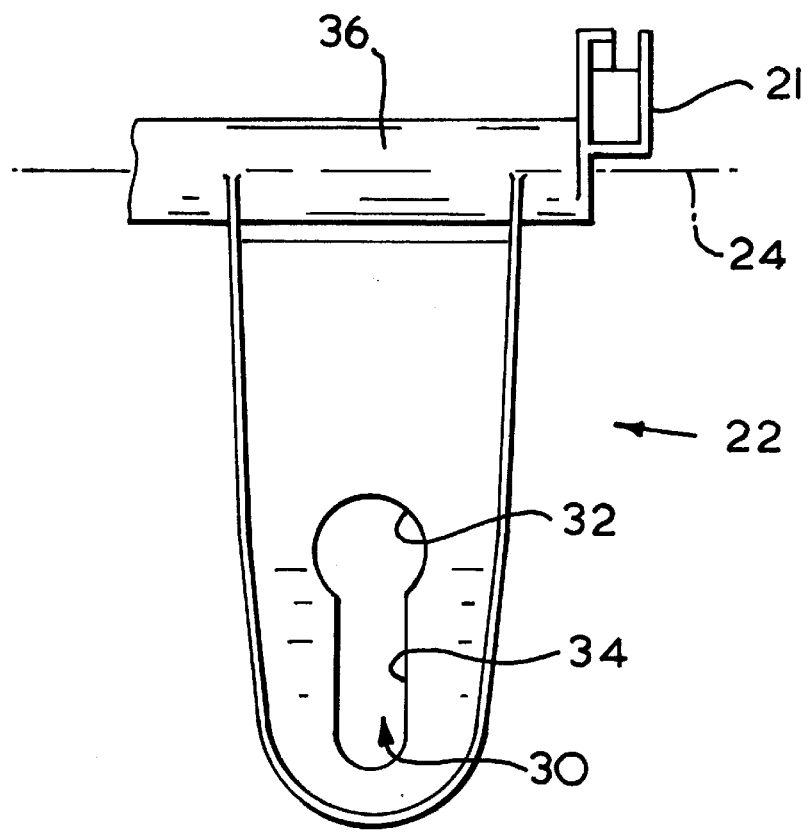
FIGS. 3A and 3B show the pivotal lever from above and in perspective respectively.
Figure 3B:
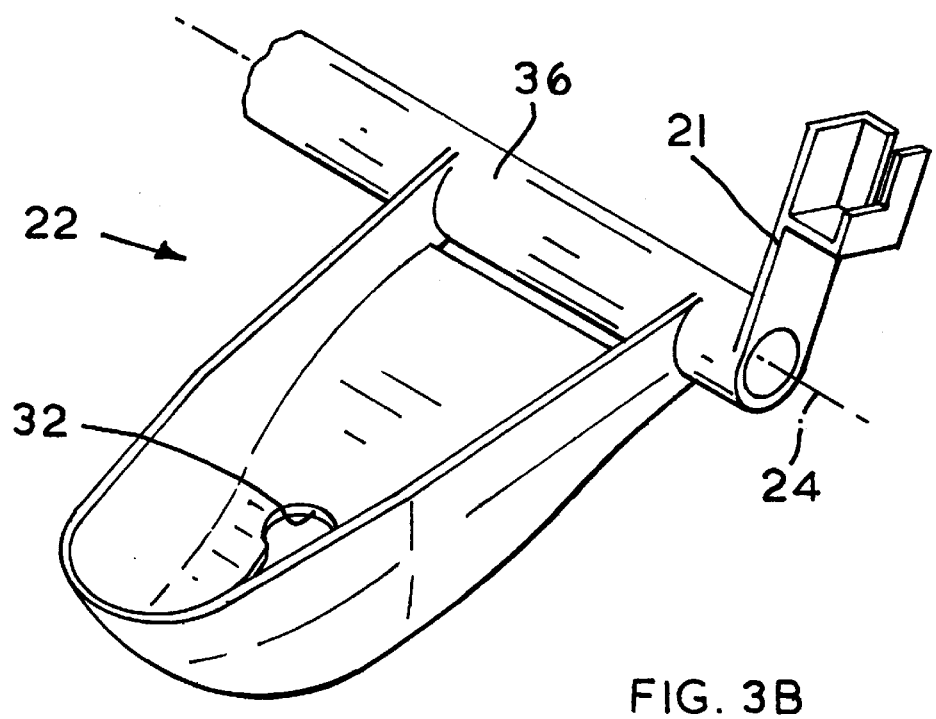

The height adjustment mechanism for each castor wheel (4) comprises a lever (22) which is pivotally mounted on the cutting deck (2) about an axis of pivot (24). FIGS. 3A and 3B show the pivotal lever (22) of the castor wheel (4) mounted on the front of the deck (2). The lever (22) is slidably attached to the sleeve (12) of the castor wheel (4) and acts as a cam, sliding the central mount (10) back and forth along the rod (20) as the lever (22) pivots in either direction, as shown in FIGS. 4 and 5.

A collar (26) is formed around the top of the sleeve (12) of each castor wheel (4) (as best shown in FIG. 2). A groove (28) is formed around the outer periphery of the collar (26). The pivotal lever (22) is trough shaped as best shown in FIG. 3B. An elongate slot (30) is formed along the length of the lever (22) in the base of the trough. At one end of the elongate slot (30), towards the axis of pivot (24) of the lever (22), a large aperture (32) has been formed resulting in an overall key shaped slot. The diameter of the large aperture (32) in the lever (22) is greater than that of the outer circumference of the collar (26). The width of the elongate slot (30) is less than the diameter of the outer circumference of the collar (26) but less than the diameter of the circumference of the groove (28).

The sleeve (12) of the central mount (10) of the castor wheel (4) is attached to the lever (22) by passing the top end of the sleeve (12), having the entrance to the bore (18), through the large aperture (32) until the groove (28) formed around the collar (26) becomes aligned with the elongate slot (30) in the lever (22). The thickness of the lever (22) around the edge (34) of the elongate slot (30) is less than the width of the groove (28). The collar (26) is moved along the length of the lever (22), the edge (34) of the elongate slot (30) entering into and sliding through the groove (28). The sleeve (12) is, therefore, able to slide back and forth along the lever (22) within the elongate slot (30). The groove (28) acts as a cam follower, sliding along the edge (34) of the elongate slot (30) as the lever (22) pivots. However, the collar (26) is prevented from being moved perpendicularly to (apart from the slight movement due to the thickness of the edge (34) of the elongate slot (30) being less than the width of the groove (28)) or withdrawn from, and hence detached from the lever (22) whilst the collar (26) is located within the elongate slot (30).

When the lawn mower is fully assembled the metal rod (20) is located within the bore (18) formed by the sleeve (12) and the collar (26) is located within the elongate slot (30) in the lever (22), such that the edge (34) of the elongate slot (30) are located within the groove (28) around the collar (26) as best shown in FIGS. 4 and 5.

The height of deck (2) above the castor wheel (4) is at its maximum when the lever (22) is pivoted in downward position, (as best shown in FIG. 4). In this position the collar (26) is located at the end of the elongate slot (30) furthest away from the large aperture (32) and the axis of pivot (24) of the lever (22). The rod (20) is of sufficient length that part of the rod (20) still remains within the bore (18) of the central mount (10) when the deck (2) is at its maximum height. Sufficient overlap is provided between the rod (20) and the bore (18) (i.e. the amount of rod (20) still located within the sleeve (12)) when the central mount (10) is extended away from the cutting deck (2) by its maximum amount to provide a strong and sturdy interconnection between the sleeve (12) and the metal rod (20), particularly when the forces are applied to the castor wheel perpendicularly to the vertical axis of swivel.

When the height of the cutting deck (2) above the castor (4) is to be reduced, the lever (22) is pivoted in an upward direction, (as best shown in FIG. 5). This moves the sleeve (12) and hence the central mount (10) along the rod (20), a greater proportion of the length of the rod (20) being located within the bore (18) of the sleeve (12). As the central mount (10) moves along the rod (20), the groove (28) slides along the sides (34) of the elongate slot (30) in the lever (22).

When the height of the cutting deck (2) above the castor is at its minimum (as best shown in FIG. 5), the whole of the metal rod (20) is located within the bore (18) of the central mount (10). In this position the collar (26) of the central mount (10) is located towards the end of the elongate slot (30) closest to the large aperture (32). The large aperture (32) is located in such a position that the collar (26) is unable to slide far enough along the elongate slot (30) in order to enter into the large aperture (34) from the elongate slot (30) while the castor wheel (4) is adjusted through its full range of height positions.

The height of deck (2) above the castor wheel (4) is fixed by locking the angular position of the lever (22).

Because the groove (28) is formed around the full circumference of the collar (26), the central mount (10) and hence the castor wheel (4) is able to freely rotate about the rod (20) whilst the collar (26) is located within the elongate slot (30) within the lever (22).

Figure 6:
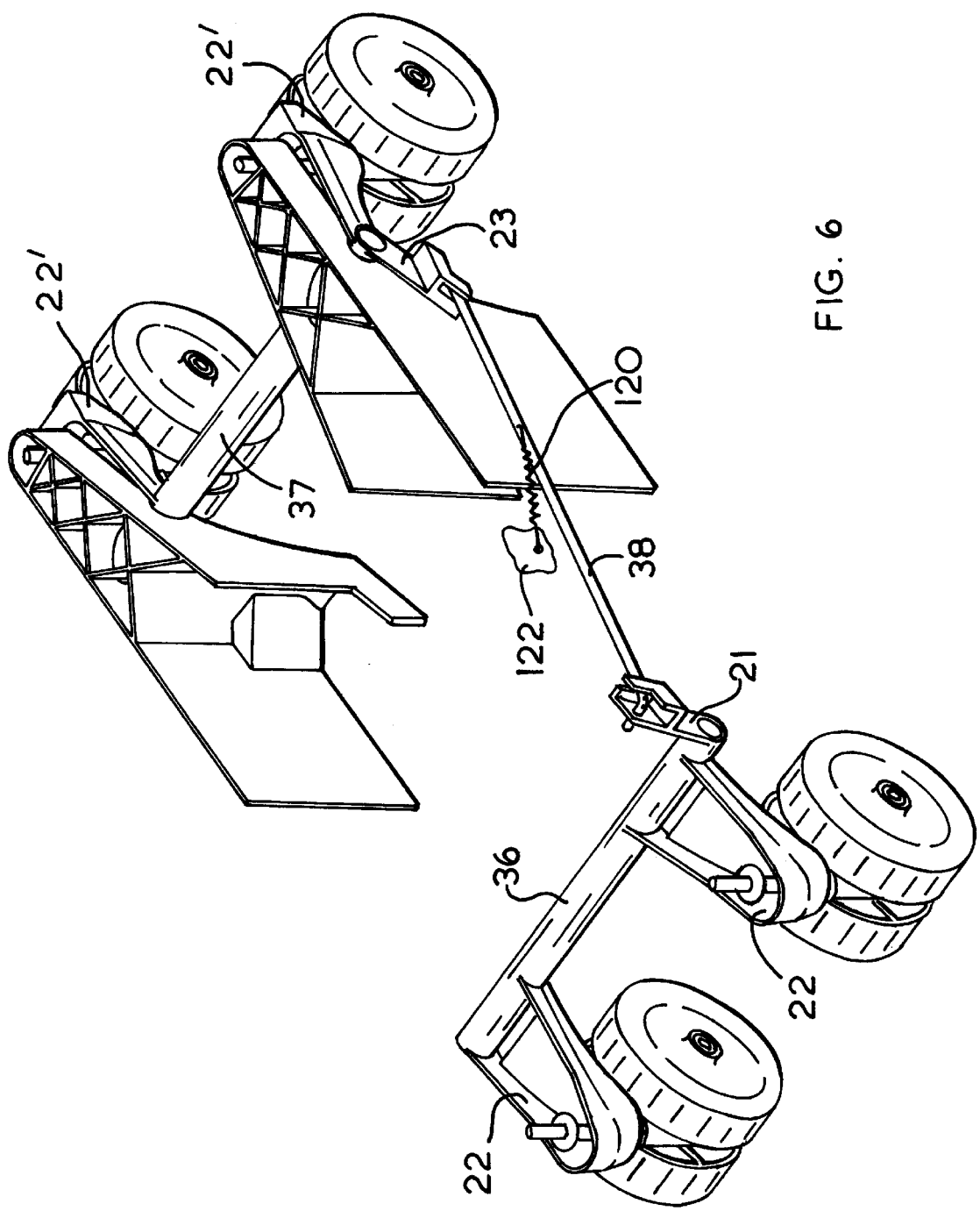
FIG. 6 shows a perspective view of the front pair of castor wheels together with corresponding pivotal levers to the ends of an interconnecting rod.

The two levers (22) which are connected to the front two castors (4) on the mower are rigidly attached in parallel to the two ends of a rod (36) perpendicularly to longitudinal axis of the rod (36) as best shown in FIG. 6. The rod (36) is mounted onto the underside of the cutting deck (2) by means of resilient clips (not shown) which wrap around and hold the rod (36). The clips are configured to allow the rod (36) to rotate about its longitudinal axis, thus enabling the two levers (22), attached to its ends, to pivot in unison about the longitudinal axis of the interconnecting rod (36).

The two levers (22) attached to the two rear castors (4) on the mower are similarly attached to the ends of a second rod (37) which is mounted in parallel to the first rod on the underside of the cutting deck (2) by resilient clips. Thus, the two rear levers (22) pivot in unison about the longitudinal axis of the second rod (37).

Figure 7A:
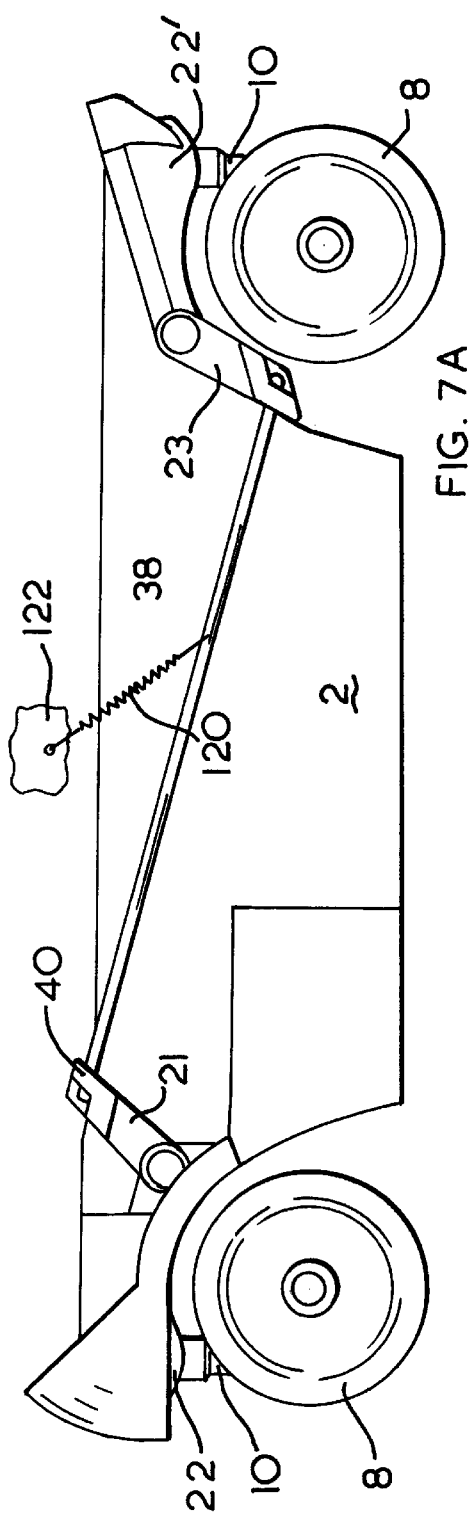
FIGS. 7A and 7B show the deck of the mower in its lowered and raised positions respectively.
Figure 7B:
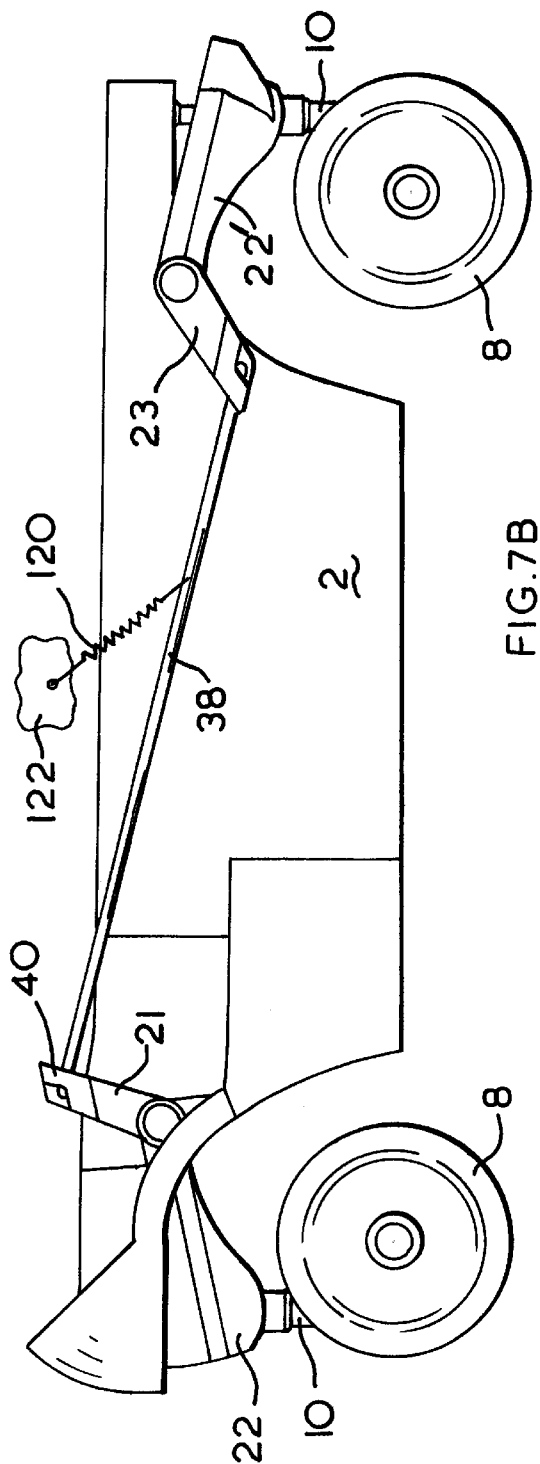

An interconnecting bar (38) is pivotally attached between one of the levers (22) connected to one of the front castors via a rod (21) rigidly attached to it and one of the levers (22) connected to one of the rear castors via a second rod (23) rigidly attached to the rear lever (22) so that all four levers (22) pivot in unison. The levers (22) attached to the front castor wheels (4) project forward in the opposite direction to the levers (22) attached to the rear castor wheels (4) which project rearward. The first rod (21) points in a general upward direction. The second points in a general downward direction. The interconnecting bar (38) pivotally attaches to the ends of the rods (21, 23) and is arranged so that clockwise rotation of the forward levers (22) results in an anti-clockwise rotation of the rear levers (22). This enables the height of the deck above all four castors to be kept constant, and that the height of the deck is adjusted in uniform manner above the four castor wheels. FIG. 7A shows the mower with the cutting deck (2) in its lowest position, FIG. 7B shows it in its highest position.

Figure 8:
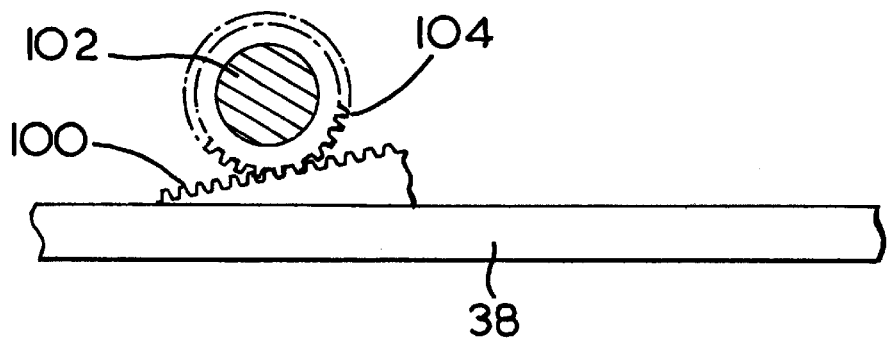
FIG. 8 shows a side view of the interconnecting bar meshing with the pinion of the first embodiment.

The height of the mower can be adjusted and locked using a height locking mechanism which will now be described with reference to FIGS. 8 and 9. The height locking mechanism has been omitted from FIGS. 1, 6 and 7 to keep these figures simple. FIGS. 8 and 9 show the structure of the height locking mechanism in detail. Other features of the mower which have no direct relevance with the structure of the height locking mechanism have been omitted from FIGS. 8 and 9 to simplify the Figures. The general location of the height locking mechanism is shown by the dashed lines (120) in FIG. 1.

Figure 9A:
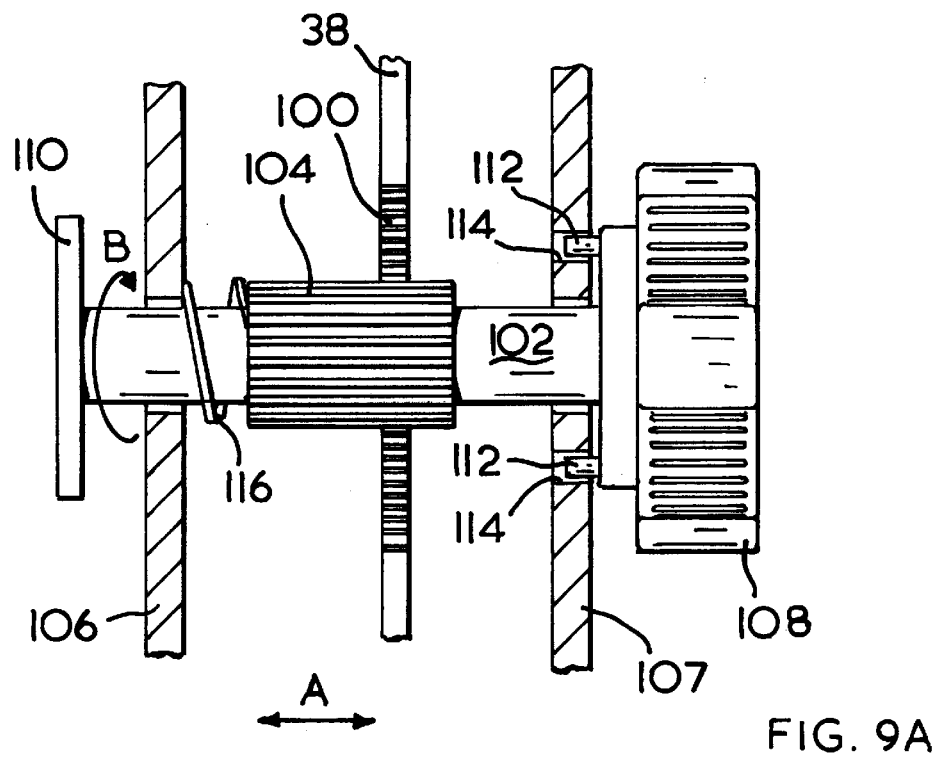
FIGS. 9A and 9B show the height locking mechanism according to the first embodiment in its two extreme positions.
Figure 9B:
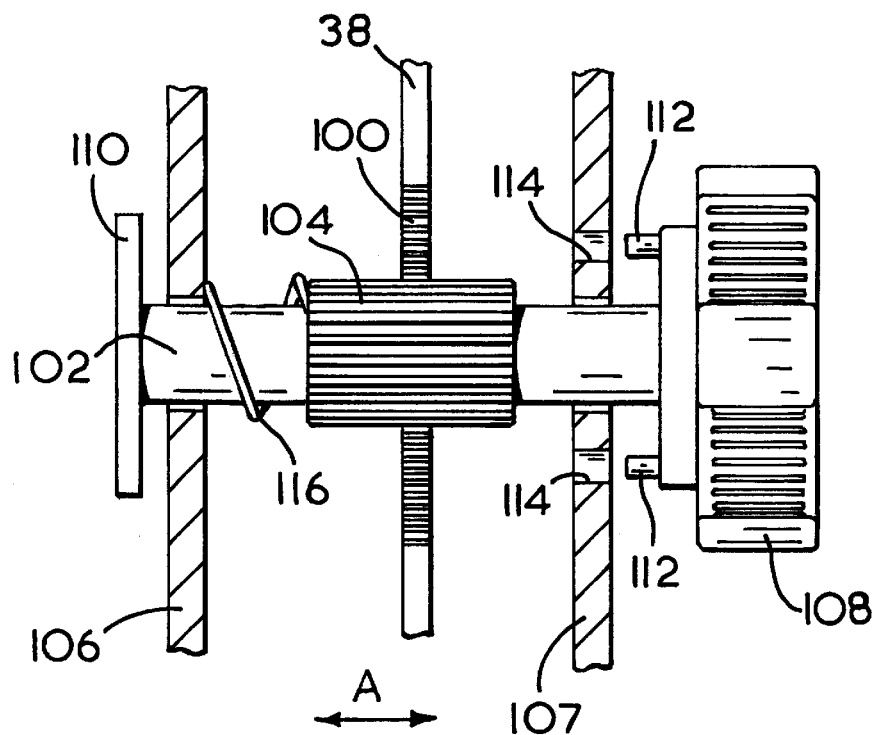

The interconnecting bar (38) which interconnects the rear and front wheel assemblies has a rack (100) formed by a plurality of rigid teeth formed along part of its length as shown in FIG. 8. A rod (102) is located above and perpendicularly to the interconnecting bar (38) as shown in FIGS. 9A and 9B. Along part of the length of the rod (102) are a plurality of rigid teeth which run parallel to the longitudinal axis of the rod (102) which form a pinion (104) around the rod (102). The rod (102) is arranged so that the teeth of the pinion (104) mesh with the teeth of the rack (100) on the interconnecting bar (38) as shown in FIG. 8. The rod (102) is mounted in the walls (106, 107) of the deck (2) of the mower in such a manner that it is axially slideable in the direction indicated by Arrow A and rotatable in the direction indicated by Arrow B. A knob (108) of circular cross section is mounted on one end of the rod (102). A flange (110) is attached to the other end. The amount of axial sliding movement of the rod is limited by the flange (110) and the knob (108), the flange (110) abutting against the wall (106) when the rod (102) is at one extreme of its range of positions, the knob (108) abutting against the second wall (107) when at the other.

A number of protrusions (112) are formed on the surface of the knob which face towards the second housing wall (107). The protrusions are located around the knob in a radial manner equidistantly from each other and from the rod. A plurality of apertures (114) are formed in the second housing wall and which are capable of cooperating with protrusions (112) when the protrusions (112) are aligned with the apertures (114). When the protrusions (112) are aligned with the apertures (114), the protrusions (112) are capable of locating within the apertures (114).

It will be evident to the reader that the protrusions (112) can be formed on the wall (107) and the apertures (114) in the knob (108), the resulting design operating in exactly the same manner.

A helical spring (116) is mounted on the rod (102) and which, at one end, is attached to the first housing wall (106). The spring (116) biases the rod, inwardly so that the knob (108) is biased towards the second housing wall (107) whilst the flange (110) is biased away from the first housing wall (106). When the protrusions (112) are aligned with the apertures (114), the protrusions are biased towards entering the apertures (114). When the protrusions (112) are not aligned, the protrusions (112) are biased towards the surface of the second housing wall (107).

When the mower is in normal use, the rod (102) and knob (108) are in the positions indicated in FIG. 9A. The protrusions (112) are located in the apertures (114) as shown and held within the apertures (114) by the biasing force of the spring (116). Whilst in this position the knob (108) and hence the rod (102) is prevented from rotating. As the rod (102) cannot rotate, the pinion (104) on the rod (102) are held rigidly which in turn prevent movement of the rack (100) on the interconnecting bar (38) which meshes with the pinion (104) on the rod (102). Therefore, the interconnecting bar (38) is prevented from axial movement and thus the height of the mower remains fixed.

When a user wishes to adjust the height, he pulls the knob (108) and hence the rod against the biasing force of the spring (116) away from the second housing wall (107) until the protrusions (112) are removed from the apertures (114). See FIG. 9B. When the protrusions (112) are free of the apertures (114), the user can rotate the knob (108) and hence the rod (102) thus rotating the pinion (104) on the rod. The width of the pinion (104) along the rod is such that it remains meshed with the rack (100) on the interconnecting rod (38) throughout the full range of axial movement of the rod (102). The user rotates the knob (108), rotating the pinion (104) which in turn moves the interconnecting bar (38) along its longitudinal axis. This results in the height of the mower being adjusted. The user then releases the knob (108) which moves towards the second housing wall (107) due to the biasing force of the spring (116). If the protrusions (112) are aligned with the apertures (114), the protrusions enter into the apertures (114) preventing rotation of the knob (108), thus fixing the height of the mower at the new height setting. If they are not aligned the protrusions will engage the surface of the second housing wall (107). The weight of the mower biases the interconnecting bar (38) to a position where the body of the mower is at its lowest position. The biasing force is transferred to the rod (102) via the rack (100) and pinion (104). The biasing force due to the weight causes the rod (102) and hence the knob (108) to rotate. As the knob (108) rotates, the protrusions rotate until they align with the apertures (114) at which point they enter the apertures due to biasing force of the spring (116). The knob (108) is thereby prevented from further rotation thus fixing the height of the mower. The height of the mower can be adjusted through a range of positions by adjusting the knob and can be held in those positions by the protrusions.

Though the operator is able to adjust the height of the mower using rack (100) and pinion (104) alone, it may be difficult due to the weight of the mower particularly larger types of mower. Therefore a second helical support spring (120) is attached between the interconnecting bar (38) and part (122) of the body of the mower as shown in FIGS. 1, 6, 7 and 8, to help counter the weight of the mower acting on the interconnecting bar (38). The biasing force of the spring is arranged so that it pulls the interconnecting bar (38) in the direction indicated by Arrow C in FIG. 6. Movement of the interconnecting bar (38) in the direction of Arrow C raises the height of the mower. Thus the spring (120) provides a biasing force against the weight of the mower which forces it to its lowest position. It can be arranged so that the strength of the spring is sufficiently large enough that the deck (2) of the mower is biased to its highest position.

Markers, for example, in the form of numbers may be attached to the outer housing wall (107) around the knob to indicate the position of a corresponding marker, such as an arrow, attached to the top surface of the knob and which cooperates with the markers on the surface (107) to indicate a height setting.

The second embodiment of the invention is the same as that of the first embodiment except that the diameter of the pinion (104) is substantially reduced and the diameter of the knob (108) is greatly increased relative to each other in order to produce a greater mechanical advantage. This results in the operator having to apply less rotational force to the knob thus easing the height adjustment method. Due to the extra mechanical advantage gained, the operator is able to easily support the weight of the mower at a pre-set height by the knob. Therefore, the spring (120) is omitted as the operator no longer requires any assistance in raising the deck of the mower even on larger mowers due to mechanical advantage gained. However, the reader will appreciate that the spring may still be retained, attached between the body of the mower and the interconnecting bar.

The third embodiment of the invention is the same as that of the first embodiment except that the support spring (120) is replaced by a torsion spring connected between the knob (108) and the wall (107) of the mower. The torsion spring applies a rotation force on the knob urging it to rotate in a manner which results in the raising of the height of the mower.

The fourth embodiment will now be described with reference to FIGS. 10 to 13. The construction is extremely similar to the first embodiment of the invention. In both FIGS. 10 and 11, the outer wall has been cut away to show the interconnecting bar behind it. The difference between the first and fourth embodiment is that the central rod (102) is formed with a tubular passageway (500) which runs the full length of the rod (102) and into a larger circular aperture (502) formed within the knob (108) and which is coaxial with the tubular passageway (500) running through the length of the rod (102). A bolt (504) passes co-axially through the larger aperture (502) of this knob (108) and the tubular passageway (500) of the rod (102) and is fixed securely at one end to the wall (106) of the mower. The rod (102) together with the knob (108) are able to axially slide along the bolt (504). A washer (508) is rigidly attached to the free end of the bolt (504) away from the housing wall (106). The spring (116) in the first embodiment of the invention has been removed and replaced by another spring (510) located within the large aperture (502) within the knob (108) and is sandwiched between the inner wall of the washer (508) and the base (512) of the aperture (502). The spring (510) is under compressional force such that the knob (108), rod (102) and pinion (104) are forced inwardly towards the wall (106) of the mower thus biasing the protrusions (112) into the apertures (114) formed in the wall (107).

Figure 10:
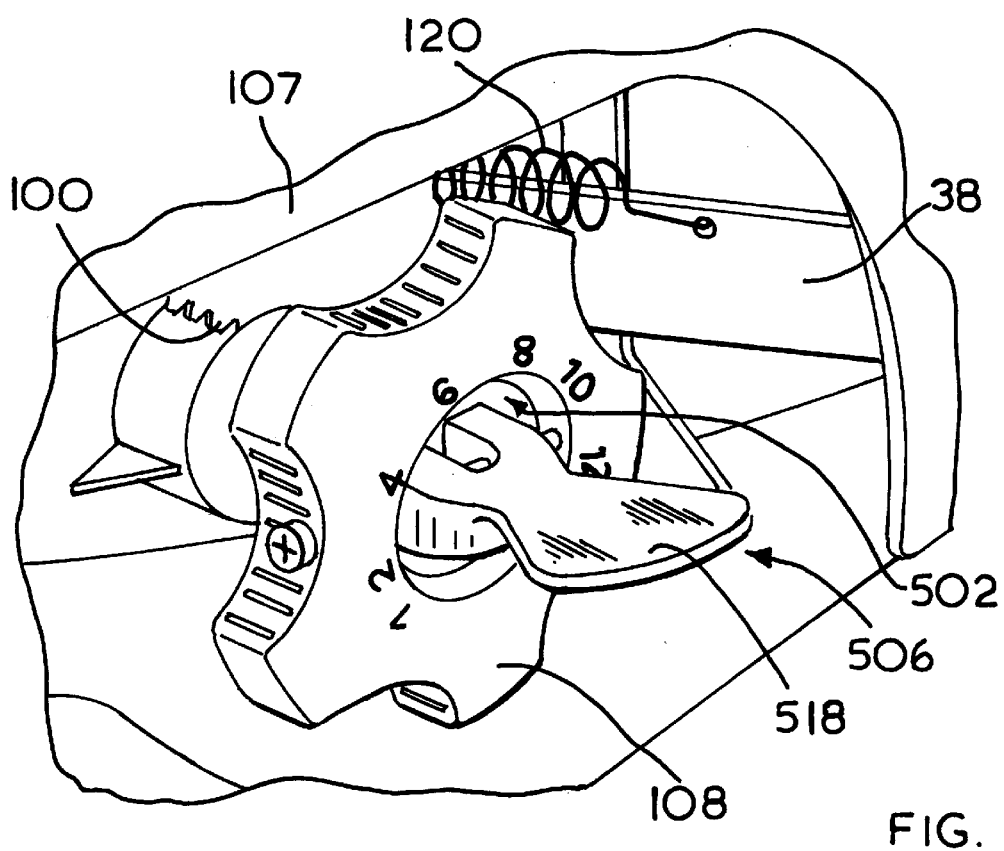
FIG. 10 shows a perspective view of the knob with the key projecting outwardly in accordance with the fourth embodiment of the invention.
Figure 11:
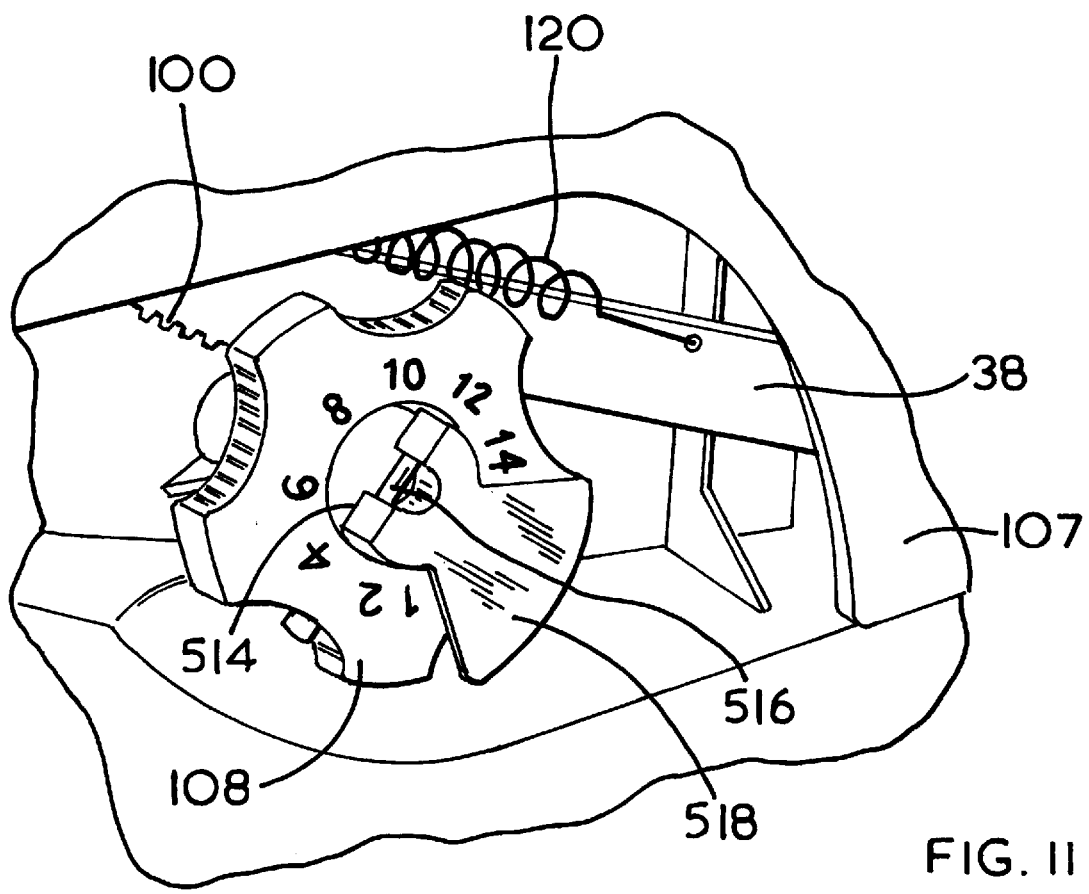
FIG. 11 shows a view of the knob with the key flush against the knob in accordance with the fourth embodiment of the invention.
Figure 12:
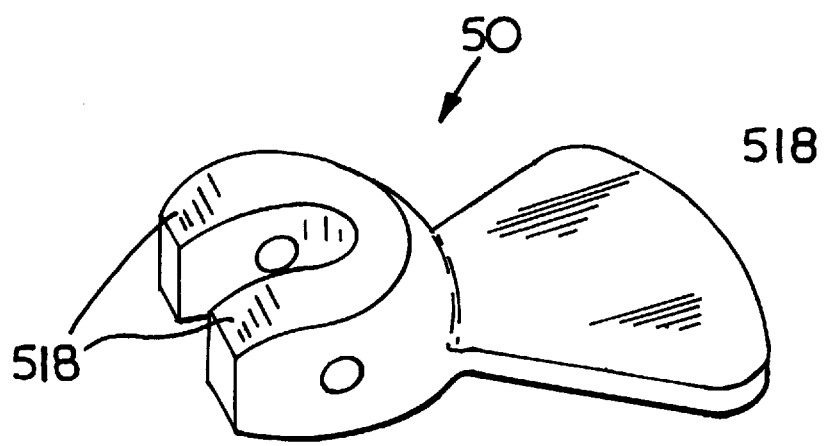
FIG. 12 shows a perspective view of the key as described in the fourth embodiment of the invention.
Figure 13A:
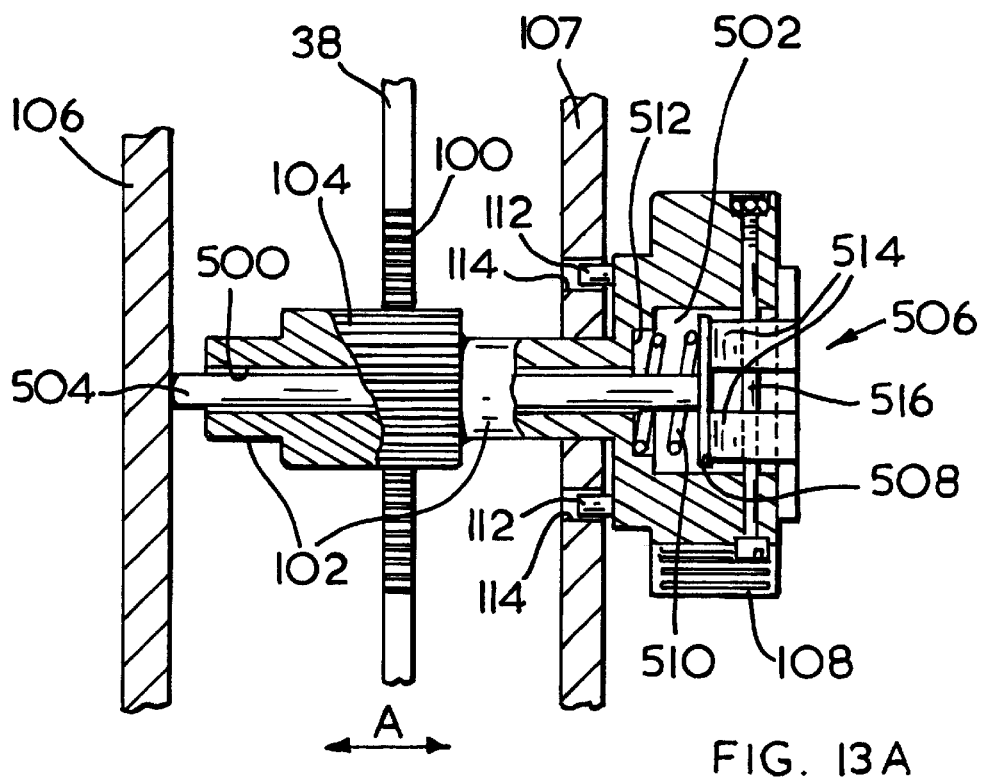
FIGS. 13A and 13B show a schematic diagram of a vertical cross section of the height locking mechanism according to the fourth embodiment of the invention in its two extreme positions.
Figure 13B:
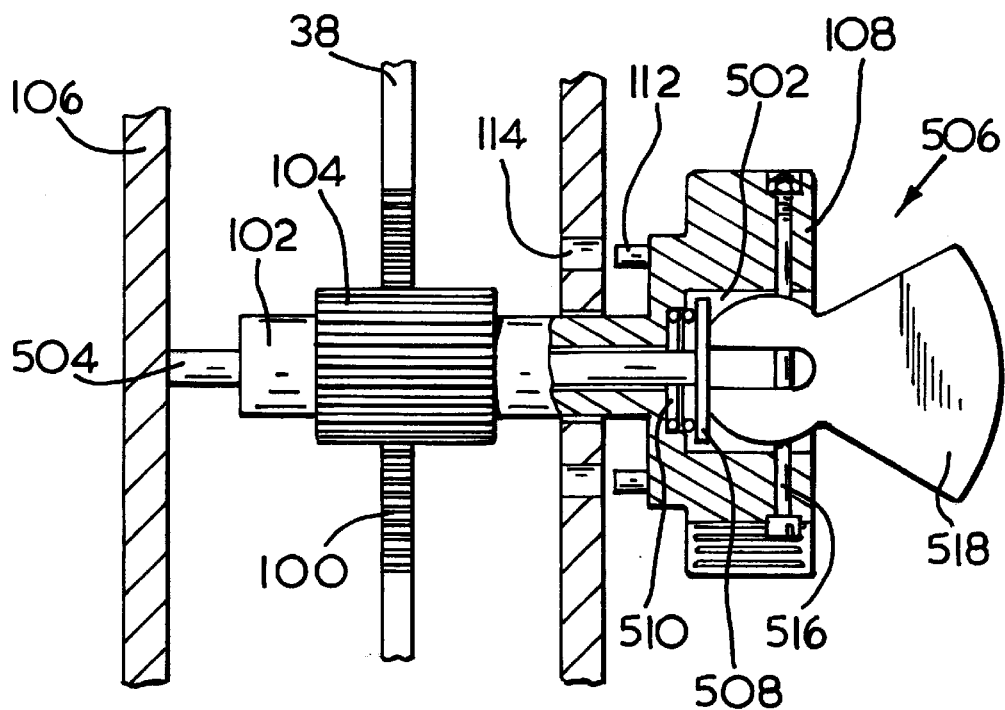

A key (506) as best shown in FIG. 12 comprising a cam (514) is pivotally mounted upon a spindle (516) which passes through the knob (see FIGS. 10, 11 and 13) the axis of the spindle (516) being perpendicular to the longitudinal axis of the bolt. When the knob (105) rotates, the spindle (516) and hence the key (506) also rotate. The cam (514) of the key (506) abuts against the washer (508) attached to the end of the bolt (504). Pivotal movement of the key (506) about the spindle (516) from a flush position as shown in FIGS. 11 and 13A to an outward position as shown in FIGS. 10 and 13B, results in the cam (514) forcing the knob outwardly in relation to the washer (508) against the biasing force of the spring (510) which in turn moves the rod (102) and pinion (104) outwardly thus disengaging the protrusions (112) from the apertures (114) and enabling the user to freely rotate the rod (102). The shape of the cam (514) is such that when the key is flush with the knob (105) or perpendicular to the knob (108) the knob is held axially stationary by the biasing force of the spring (510) and the shape of the cam (514). The knob (108) is held rotatingly stationary in its inner position by the protrusions (112) engaging the apertures (114) formed in the wall (107).

The key (506) is formed with a large grip area (518). Thus when the key (506) is pivoted outwardly as shown in FIGS. 10 and 13B, the user is able to grab the grip area (518) of the key (506) and rotate it, thus rotating the knob (108) and hence adjust the height. Once the operator has adjusted the mower to the set height, he pivots the key (506) back to a position so that it is flush with the knob, as shown in FIGS. 11 and 13A, thus preventing relative movement between the knob (108) and the wall (107) because the protrusions (112) engage with the apertures (14) formed in the mower wall (107).

The embodiments previously described show the knob (108) having protrusions (112) which engage with an outer wall (107) of the deck (2). It is clear to a person skilled in the art that the protrusions (112) could engage holes formed in any part of the deck (2), e.g. on the inner wall (106). Alternatively, the protrusions could be formed on the end or any part of the rod (102), for example they could be formed adjacent the pinion (104). Furthermore, a person skilled in the art would understand that protrusions (112) and apertures (114) are interchangeable.

What is claimed is:

1. A lawn mower, comprising:
   a deck;
   wheel assemblies;
   height adjustment mechanisms positioned intermediate the deck and wheel assemblies;
   an interconnecting bar positioned between at least two of the height adjustment mechanisms, the interconnecting bar being connected to the height adjustment mechanisms to transfer the movement of one height adjustment mechanism to the other height adjustment mechanism so that the height adjustment mechanisms operate in unison;
   a rack located on the interconnecting bar;
   a locking mechanism attached with the rack to hold the interconnecting bar stationary relative to the deck, the locking mechanism comprising a pinion rotatably mounted on the deck, the pinion meshing with the rack to releasably lock the locking mechanism in a plurality of angular positions.

2. The lawn mower of claim 1, wherein the pinion is slidable between a first fixed position a second rotatable position.

3. The lawn mower of claim 2, wherein the pinion is biased towards the first position.

4. The lawn mower of claim 2, wherein a cam mechanism is used to axially slide the pinion between the first and second positions.

5. The lawn mower of claim 4, wherein the pinion is co-axially and rigidly mounted on an axially slideable rod.

6. The lawn mower of claim 5, further comprising a knob rigidly mounted on one end of the rod.

7. The lawn mower of claim 6, wherein the cam mechanism operates between the knob and the deck of the mower.

8. The lawn mower of claim 6, wherein the knob abuts against part of the deck when the pinion is in the first position.

9. The lawn mower of claim 7, wherein the cam mechanism comprises a cam which is pivotally mounted on the knob.

10. The lawn mower of claim 9, wherein the cam mechanism comprises a lever.

11. The lawn mower of claim 10, wherein the lever comprises a large grip area.

12. The lawn mower of claim 6, wherein the knob co-operates with the deck to prevent the pinion from rotating when the pinion is in the first position.

13. The lawn mower of claim 12, wherein the knob comprises protrusions which engage with apertures formed in a part of the deck when the pinion is in the first position to prevent the pinion from rotating.

14. The lawn mower of claim 12, wherein the deck comprises protrusions which engage with apertures formed in the knob when the pinion is in the first position to prevent the pinion from rotating.

15. The lawn mower of claim 6, wherein the pinion has a small diameter and the knob has a large diameter in order to provide a mechanical advantage to ease the height adjustment operation.

16. The lawn mower of claim 1, further comprising biasing means positioned between the deck and the wheel assemblies to provide an upward biasing force on the deck which counters, at least in part, the downward force of the deck due to its weight.

17. The lawn mower of claim 16, wherein the biasing means has a strength sufficient to overcome the downward force of the deck due to its weight in order to bias the deck to its highest position.

18. The lawn mower of claim 16, wherein the biasing means comprises a spring connected between the interconnecting bar and the deck.

19. The lawn mower of claim 16, wherein the pinion is co-axially and rigidly mounted on an axially slideable rod.

20. The lawn mower of claim 19, further comprising a knob rigidly mounted on one end of the rod.

21. The lawn mower of claim 20, wherein the biasing means comprises a torsion spring which connects between the knob and the deck and which provides a rotational biasing force on the knob.

22. The lawn mower of claim 12, wherein the rod comprises protrusions which engage with apertures formed in a part of the deck when the pinion is in the first position to prevent the pinion from rotating.

23. The lawn mower of claim 12, wherein the deck comprises protrusions which engage with apertures formed in the rod when the pinion is in the first position to prevent the pinion from rotating.

* * * * *